United States Patent [19]

Cain et al.

[11] Patent Number: 5,576,045
[45] Date of Patent: Nov. 19, 1996

[54] ANTI-BLOOM TRIGLYCERIDE COMPOSITIONS

[76] Inventors: Frederick W. Cain, Dr Blookerstraat 13, Voorburg 2271 VL; Adrian D. Hughes, Torenstraat 147, Den Haag 2513 Br Den Haag, both of Netherlands; John H. Pierce, 24 Purbeck Rd., Rushden Northants NN10 9UH, Great Britain

[21] Appl. No.: 448,450

[22] PCT Filed: Nov. 18, 1993

[86] PCT No.: PCT/EP93/03254

§ 371 Date: Jun. 2, 1995

§ 102(e) Date: Jun. 2, 1995

[87] PCT Pub. No.: WO94/12045

PCT Pub. Date: Jun. 9, 1994

[30] Foreign Application Priority Data

Dec. 2, 1992 [EP] European Pat. Off. .............. 92311016

[51] Int. Cl.⁶ ..................................................... A23D 9/00
[52] U.S. Cl. .............................. 426/607; 426/98; 426/660
[58] Field of Search ..................................... 426/607, 613, 426/606, 660, 98, 99

[56] References Cited

U.S. PATENT DOCUMENTS

| | | | |
|---|---|---|---|
| 5,288,513 | 2/1994 | Cain | 426/660 |
| 5,324,533 | 6/1994 | Cain | 426/607 |
| 5,342,644 | 8/1994 | Cain | 426/613 |
| 5,366,752 | 11/1994 | Cain | 426/610 |
| 5,405,639 | 4/1995 | Pierce | 426/610 |
| 5,409,719 | 4/1995 | Cain | 426/103 |
| 5,424,091 | 6/1995 | Cain | 426/610 |
| 5,431,948 | 7/1995 | Cain | 426/607 |
| 5,439,700 | 8/1995 | Cain | 426/607 |

*Primary Examiner*—Carolyn Paden
*Attorney, Agent, or Firm*—Cushman Darby & Cushman, L.L.P.

[57] ABSTRACT

The invention concerns triglyceride compositions of the $H_2M$-type (H=saturated fatty acids $C_{16}$–$C_{24}$; M=saturated fatty acids $C_{10}$–$C_{14}$), wherein at least 30% $H_2M$ is present, while the weight ratio of the two isomers HHM:HMH is more than 3.0. Application of these fats, e.g. as blends with fats high in SUS and/or fats high in ($U_2S+U_3$) in chocolate compositions results in improved bloom behavior (S=saturated fatty acid $C_{16}$–$C_{22}$; U- unsaturated fatty acid $\geq C_{18}$).

8 Claims, No Drawings

ANTI-BLOOM TRIGLYCERIDE COMPOSITIONS

BACKGROUND OF THE INVENTION

Anti-bloom triglyceride compositions Blooming of chocolate or of compositions containing chocolate fats is a well-known problem. In our European patent applications 92201848.6; 92201849.4; 92200677.0 and 92201472.5 we have explained the problem of blooming of chocolate fats. As a solution for the above problem, we have presented in these applications the use of ($H_2M+M_2H$)-fats, H=saturated fatty acids $C_{16}$–$C_{24}$ and M=saturated fatty acids $C_{10}$–$C_{14}$, in chocolate compositions, either as ($H_2M+M_2H$)-fats per se, or as a mid fraction thereof, or combined with a soft fat high in ($U_2S+U_3$)-fats (U=unsaturated fatty acids; $C_{18}+$; S=saturated fatty acids $C_{16}+$).

SUMMARY OF THE INVENTION

In a further embodiment of the earlier findings we have now found triglyceride compositions that perform even better than the ($H_2M+M_2H$)-fats disclosed earlier. So, our invention concerns a triglyceride composition, containing $H_2M$-type triglycerides (H=saturated fatty acids $C_{16}$–$C_{24}$; M=saturated fatty acids $C_{10}$–$C_{14}$), wherein the composition contains at least 30 wt % of the ($H_2M$ fat), while the weight ratio of the two possible $H_2M$-triglycerides (HHM and HMH) i.e. HHM:HMH is more than 3, preferably more than 5, most preferably more than 10.

It should be stated here that fats high in HHM-triglycerides were earlier disclosed in EP 170 431. However, it is only stated therein, that a-symmetric glycerides MHH, wherein M is saturated fatty acid with up to 8 C-atoms, while H=$C_{16}$/$C_{18}$, are very good structuring fats for spreads and the like.

According to EP 322,027 reduced calorie fats comprise triglycerides of the MML, MLM, LLM and LML-type, while the fat must have a very specific fatty acid distribution. Nothing is disclosed about the ratio HHM:HMH of the triglycerides.

A similar disclosure can be found in WO 91/09537. The fats are applied as a blend with a sugar in e.g. chocolate flavored candy bars, chocolate-flavored coatings for enrobed products, etc. However, again the triglycerides are used to achieve a calorie reduction.

DETAILED DESCRIPTION OF THE INVENTION

The triglycerides according to our invention can be made according to known enzymatic processes (cf. e.g. EP 170 431). A process for the enzymic preparation of these fats high in HHM is e.g. an enzymic conversion, applying a 1,3-specific enzyme, preferably on a support, wherein a trisaturated triglyceride, high in $H_3$ is converted with a free fatty acid, or an ester thereof, providing moieties M, under such conditions, such as molar ratio triglyceride/fatty acid or esters (preferably about 1:1) that a product is formed and isolated, optionally after a fractionation with an HHM:HMH weight ratio of more than 3.0. Depending on the exact procedure the enzymically made fats can be racemic or chiral. The production of chiral triglycerides is e.g. illustrated in our co-pending European Patent Application 92309904.8.

A very convenient way for the application of the novel fats according to the invention is to apply these fats as blend with other triglycerides. Therefore, in another embodiment of the invention, the invention also concerns blends of triglycerides, comprising fats A and B and/or C, wherein fat A is a fat, containing $H_2M$-fats, fat B is a fat, containing SUS triglycerides, fat C is a fat, high in unsaturated triglycerides ($U_2S+U_3$), S being saturated fatty acid $C_{16}$–$C_{22}$, U being unsaturated fatty acid with at least 18 C-atoms, preferably $C_{18:1}$ or $C_{18:2}$, which blend comprises:

the triglyceride composition according to claim 1 as fat A and a fat with at least 30 wt %, preferably at least 45 wt % of SUS as fat B and/or a fat with an ($U_2S+U_3$) content of at least 30 wt %, preferably at least 45 wt % as fat C.

In these blends fat A is present in amounts of 1–50 wt %, preferably 5–40 wt %, most preferably 20–30 wt %; fat B in amounts of 0–99 wt %, preferably 40–75 wt % and fat C in amounts of 0–90 wt %, preferably 10–30 wt %, however, with the pre-requisite that the total of fats B and C is always more than 0%.

The anti-bloom activity of the novel composition is established, when the chocolate composition contains, as part of its fat phase, 0.5–5 wt % of above HHM-rich composition according to claim 1 (based on the chocolate composition).

The fat phase of the chocolate composition can consist for 5–95 wt %, preferably 15–85 wt % of above blend of fats A, B and/or C.

It is also possible to apply the triglyceride composition, rich in HHM in confectionery filling compositions. In that case the fat phase of the filling composition consists for 2.5–50 wt %, preferably 10–25 wt % of the triglyceride composition according to the invention, rich in HHM (weight ratio HHM:HMH>3.0).

These confectionery filling compositions of course can be encapsulated or partially coated in a chocolate coating.

Examples of encapsulated (or coated) products can be found in EP 92201848.6 and are e.g. bonbons, pralines, toffees, biscuits, cookies, fried food products, cakes etc. Therefore, food products, wherein at least part of the fat phase consists of the triglyceride composition according to this invention are also part of the invention.

EXAMPLES

1. Preparation of a triglyceride high in HHM (H=$C_{16:0}$ and $C_{18:0}$, M=lauric and myristic)

A palm oil topfraction, high in $H_3$ was enzymically interesterified with lauric acid in the presence of a 1,3-specific enzyme. The conditions hereby were as follows:

Feedstock $H_3$: lauric acid molar ratio 1:1

Enzyme : SP-392 (NOVO)

Temperature : 70° C.

Water activity (silica pre-column) 20%, reduced to 10%

Flow rate : total 27 g/hr

FAME conversion: 87%

The reaction product was molecularly distilled to remove excess free fatty acids, fractionated to remove high melting triglycerides and in a further fractionation the low melting triglycerides were removed. The mid fractions were combined. Yield 20%, containing 74% $C_{44}$/$C_{46}$-triglycerides, wherein 88% H was in the 2-position (so: substantially HHM). The analysis of this product was:

| Carbon no.: | | | | | |
|---|---|---|---|---|---|
| 10.4% | $C_{40}$ | 12.1% | $C_{46}$ | 0.7% | $C_{52}$ |
| 4.0% | $C_{42}$ | 6.3% | $C_{48}$ | 0.2% | $C_{54}$ |
| 62.2% | $C_{44}$ | 4.1% | $C_{50}$ | | |
| FAME: | | | | | |
| 0.1% | $C_{10:0}$ | 63.9% | $C_{16:0}$ | 0.1% | $C_{18:2}$ |
| 27.3% | $C_{12:0}$ | 4.4% | $C_{18:0}$ | 0.4% | others |
| 2.5% | $C_{14:0}$ | 1.3% | $C_{18:1}$ | | |
| 2-lipolysis FAME | | | | | |
| 3.2% | $C_{12:0}$ | 1.7% | $C_{18:1}$ | | |
| 1.9% | $C_{14:0}$ | 0.1% | $C_{18:2}$ | | |
| 88.5% | $C_{16:0}$ | | | | |
| 4.8% | $C_{18:0}$ | | | | |

2. Preparation of a triglyceride high in HMH

Example 1 was repeated, however, starting from trilaurin ($M_3$) and palmitic acid and applying the following conditions:

Feedstock : M3/palm acid (mol. ratio) 1:9

Enzyme: SP-392 (NOVO)

Temperature: 70° C.

Water activity (silica pre-column) 8%

Flow rate: total 100 g/hr

FAME conversion: 48%

After molecular distillation to remove free fatty acids and acetone fractionation the mid fractions (yield 24%) were collected and displayed the following carbon number distribution:

| Carbon no.: | | | | | |
|---|---|---|---|---|---|
| 6.6% | $C_{36}$ | 1.7% | $C_{42}$ | 5.5% | $C_{48}$ |
| 0.3% | $C_{38}$ | 51.3% | $C_{44}$ | 1.3% | $C_{50}$ |
| 28.4% | $C_{40}$ | 4.6% | $C_{46}$ | 0.3% | $C_{52}$ |
| FAME | | | | | |
| 0.1% | $C_{10:0}$ | 2.4% | $C_{18:0}$ | | |
| 40.4% | $C_{12:0}$ | 0.2% | $C_{18:1}$ | | |
| 0.6% | $C_{14:0}$ | | | | |
| 56.2% | $C_{16:0}$ | | | | |
| 2-Lipolysis FAME | | | | | |
| 84.5% | $C_{12:0}$ | 12.8% | $C_{16:0}$ | | |
| 0.6% | $C_{14:0}$ | 1.2% | $C_{18:0}$ | | |

So, the $H_2M$ composition of the product was substantially HMH.

3. Application of the HHM, resp. HMH-rich fats in chocolate

Recipe:

Refined flakes: 85.6%

Cocoa butter: 12.9%

Fat: 1.5%

Lecithin: 0.4%

The refined flakes, consisted of:

Sugar: 58.7% cocoa powder: 22.0% cocoa butter: 19.3%

Bars were prepared using the following fats:

1) cocoa butter
2) HHM of example 1
3) HMH of example 2
4) $H_2M$-mid fraction according to EP 92201849.4

The bars were placed on storage at 20° C./32° C. The results of an evaluation were:

| Fat | $H_2M$ content of fat % | HHM/HMH-ratio | Bloom |
|---|---|---|---|
| cocoa butter | trace | — | 2 weeks |
| HHM (ex. 1) | 78 | about 14.0 | >5 months |
| HMH (ex. 2) | 59 | 0.2 | 2 weeks |
| $H_2M$-mid fr. | 53 | 2.0 | 3 months |

We claim:

1. Triglyceride composition containing $H_2M$-type triglycerides (H=saturated fatty acids $C_{16}$–$C_{24}$; M=saturated fatty acids $C_{10}$–$C_{14}$), wherein the composition contains at least 30 wt % of the ($H_2M$)-fat, while the weight ratio of the two possible H2M-triglycerides (HHM and HMH) i.e. HHM-:HMH is more than 3, preferably more than 5, most preferably more than 10.

2. Triglyceride composition according to claim 1, wherein the composition is an enzymically made triglyceride composition.

3. Chocolate composition, comprising a fat-phase, wherein the triglyceride composition according to claim 1 is present as part of the fat phase, in such an amount that the chocolate composition contains 0.5–5 wt % of the triglyceride composition according to claim 1.

4. Confectionery filling composition, comprising a fat-phase, wherein 2.5–50 wt %, preferably 10–25 wt % of the fat phase consists of the triglyceride composition according to claim 1.

5. Encapsulated confectionery filling composition, wherein the confectionery filling composition according to claim 4 is encapsulated or partially coated in a chocolate coating.

6. Blend of triglycerides, comprising fats A and B and/or C, wherein fat A is a fat, containing $H_2M$-fats, fat B is a fat, containing SUS triglycerides, fat C is a fat, high in unsaturated triglycerides ($U_2S + U_3$), S being saturated fatty acid $C_{16}$–$C_{22}$, U being unsaturated fatty acid with at least 18 C-atoms, preferably $C_{18:1}$ or $C_{18:2}$, which blend comprises:

the triglyceride composition according to claim 1 as fat A and a fat with at least 30 wt %, preferably at least 45 wt % of SUS as fat B and/or a fat with an ($U_2S+U_3$) content of at least 30 wt %, preferably at least 45 wt % as fat C.

7. Blend according to claim 6, wherein fat A is present in 1–50 wt %, preferably 5–40 wt %, most preferably 20–30 wt % fat B is present in 0–99 wt %, preferably 40–75 wt % fat C is present in 0–90 wt %, preferably 10–30 wt % with the pre-requisite that the total of B and C is always more than 0%.

8. Chocolate composition, comprising a fat-phase, wherein 5–95 wt %, preferably 15–85 wt % of the fat phase of the chocolate composition consists of the blend according to claim 6.

* * * * *